US008615888B2

(12) United States Patent
Catalano et al.

(10) Patent No.: US 8,615,888 B2
(45) Date of Patent: Dec. 31, 2013

(54) IMPAIRED GRIP KNIFE

(75) Inventors: Carol Catalano, Hamilton, MA (US); Aaron Double, Charlestown, MA (US)

(73) Assignee: Dexter-Russell, Inc., Southbridge, MA (US)

(*) Notice: Subject to any disclaimer, the term of this patent is extended or adjusted under 35 U.S.C. 154(b) by 762 days.

(21) Appl. No.: 12/494,692

(22) Filed: Jun. 30, 2009

(65) Prior Publication Data

US 2010/0325901 A1 Dec. 30, 2010

(51) Int. Cl.

*B25G 1/00* (2006.01)
*B25G 1/12* (2006.01)
*B25G 3/00* (2006.01)
*B26B 3/06* (2006.01)
*F41B 13/02* (2006.01)
*B23D 51/01* (2006.01)

(52) U.S. Cl.

USPC .................................. 30/340; 30/151; 30/517

(58) Field of Classification Search

USPC ........... 30/151, 164, 514, 517–524, 142–150, 30/231–232, 340; 15/143.1; 16/430, 436, 16/DIG. 12, DIG. 19

See application file for complete search history.

(56) References Cited

U.S. PATENT DOCUMENTS 2,205,769 A * 6/1940 Sweetland ...................... 81/492
2,520,355 A * 8/1950 Bell ................................ 30/340
2,651,839 A * 9/1953 Folland ........................... 30/125
3,122,774 A * 3/1964 Lamb .............................. 16/430
3,266,081 A * 8/1966 Heim ........................... 16/110.1
4,825,552 A * 5/1989 Bendickson et al. ........... 30/342
5,251,380 A * 10/1993 Craig ............................. 30/329
D354,881 S * 1/1995 Huff ............................ D7/401.2
5,475,894 A * 12/1995 Wildforster ..................... 16/430
5,528,834 A * 6/1996 Seber et al. ..................... 30/340
D375,243 S 11/1996 Hasegawa
5,724,739 A * 3/1998 Hutton ............................ 30/356
5,791,055 A * 8/1998 Mangol ........................... 30/340
D414,989 S * 10/1999 Shamoon ....................... D7/649
5,964,009 A * 10/1999 Hoepfl et al. ................... 16/430
5,983,506 A * 11/1999 Glesser ........................... 30/340
6,131,290 A * 10/2000 Chiou ............................. 30/169
6,305,052 B1 10/2001 Sinclair
6,460,256 B2 * 10/2002 Peppel et al. ................... 30/340
6,502,314 B1 * 1/2003 McCatty ......................... 30/340
6,598,302 B1 * 7/2003 Peppel et al. ................... 30/340
6,681,664 B1 * 1/2004 Hsien ............................. 81/489
6,701,624 B1 * 3/2004 White ............................. 30/295
7,204,957 B2 * 4/2007 Tozer .............................. 422/28
7,228,632 B2 * 6/2007 Fedor et al. .................. 30/298.4
D553,907 S 10/2007 Catalano et al.
2004/0123471 A1 * 7/2004 Onion ............................. 30/340
2004/0200079 A1 * 10/2004 Stoughton et al. .............. 30/514

(Continued)

FOREIGN PATENT DOCUMENTS

GB 2359268 * 8/2001 ............... B25G 1/10

*Primary Examiner* — Ghassem Alie
*Assistant Examiner* — Bharat C Patel
(74) *Attorney, Agent, or Firm* — Lackenbach Siegel, LLP

(57) ABSTRACT

A knife has a handle with an enlarged proximate end grip portion having ribbed and unribbed surfaces. The handle has oppositely disposed thumb receiving concave unribbed surfaces at the distal end for alternate pinch-grip functions. The knife blade has a cutting edge that extends proximately below and adjacent the enlarged grip portion, and is proximately disposed with respect to the thumb receiving pinch-grip concave surfaces. The knife provides diverse impaired grip cutting functions with comfort and with fatigue.

16 Claims, 3 Drawing Sheets

(56) References Cited

U.S. PATENT DOCUMENTS

| | | | | |
|---|---|---|---|---|
| 2005/0115083 | A1* | 6/2005 | Lauridsen | 30/340 |
| 2005/0138777 | A1 | 6/2005 | Cornfield | |
| 2005/0241111 | A1* | 11/2005 | Prokop | 16/430 |

* cited by examiner

IMPAIRED GRIP KNIFE

BACKGROUND OF THE INVENTION

1. Field of the Invention

This invention relates to knives and knife handles. Specifically, this invention relates to knives and knife handles for persons having an impaired grip, such as caused by arthritis.

2. Background and Discussion of the Prior Art

Diverse knife and tool handles constructions are disclosed in the respective knife and hand tool arts. U.S. Pat. No. 6,305,052, granted Oct. 23, 2001 to Sinclair discloses a tool handle with a specific concave/convex profile for improved comfort. U.S. 2005/013877, published Jun. 30, 2005 to Cornfield discloses an implement handle having a flattened grip portion. U.S. Pat. No. 5,964,009, granted Oct. 17, 1999 to Hoepfl et al. discloses a tool handle with a hard inner body and an over molded soft resilient material cover. U.S. Pat. No. 4,825,555, granted May 2, 1989 to Bendickson et al. discloses a fillet knife having a flexible handle for improved grip for filleting fish. U.S. Des. 354,881, granted Jan. 31, 1995 to Huff shows a textured knife handle. U.S. Des. 375,243, granted Nov. 5, 1996 to Hasegawa shows a knife handle with ribbed surfaces. U.S. Trademark Reg. U.S. Pat. No. 3,376,091, registered Jan. 29, 2008 to the assignee herein shows a knife handle with ribbed and unribbed portions.

The knife art desires a knife and handle for persons having an impaired grip, which knife is readily and effectively used in difficult cutting operations.

It is therefore an object of the present invention to provide a knife for use by a person having an impaired grip.

It is another principal object of the present invention to provide a knife as aforesaid in which diverse difficult cutting functions are readily and effectively achieved by such persons having an impaired grip.

It is a further object of the present invention to provide a knife as aforesaid in which the user can effect different grip positions for respective cutting operations.

It is another object of the present invention to provide a handle for a knife as aforesaid wherein the user does not suffer fatigue or frustration in difficult cutting functions.

It is another principal object of the present invention to provide a knife handle as aforesaid having a specific construction and configuration that readily achieves the aforesaid diverse cutting operations.

It is another object of the present invention to provide a knife and handle as aforesaid of practical design and construction, and yet safe in use and operation by a person having an impaired grip.

The aforesaid knife art needs and objects are achieved by the present invention.

SUMMARY OF THE INVENTION

The knife, in one aspect, includes a handle having an enlarged specifically configured proximate grip portion, having ribbed and unribbed portions in prescribed respective positions. One handle has different contoured and configured thumb receiving recesses, and in another aspect, has distally disposed thumb receiving side recesses for alternate pinch-grip positions. The knife in a preferred embodiment has a blade with a cutting edge that extends proximately and is disposed directly below the forefinger receiving recess immediately adjacent the proximately disposed enlarged grip portion. A thumb receiving or, alternatively, a palm portion between the thumb and forefinger receiving recess is formed in the ribbed upper surface. The handle also includes oppositely disposed side thumb receiving triangularly shaped recesses formed in the unribbed distally extending side portions of the handle. The triangular recesses are disposed above a portion of the blade cutting edge and provide improved left and right hand pinch-grip cutting operations. A thermoplastic proximate end cap is provided for cutting support functions. The knife permits the impaired grip user to grip the handle in diverse cutting positions and readily and effectively undertake diverse difficult cutting operations, particularly in but not limited to culinary operations, safely and without discomfort or fatigue.

DESCRIPTION OF THE INVENTION

Figure 2:
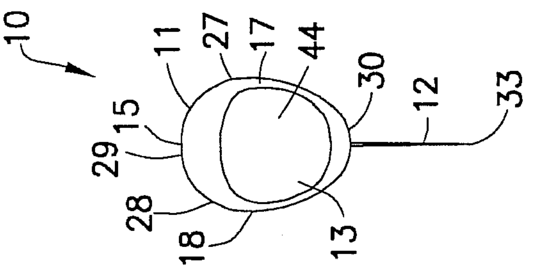
FIG. 2 is a proximate end view of the knife of FIG. 1.
Figure 1:
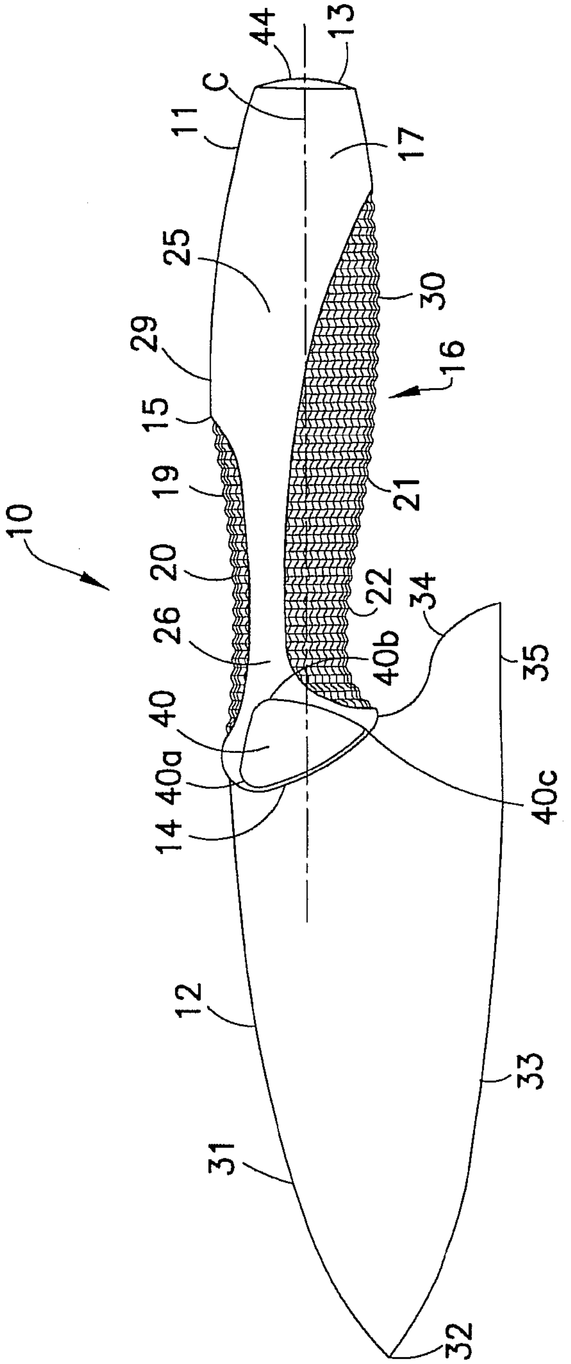
FIG. 1 is a side view of a first embodiment of the knife of the present invention.
Figure 3:
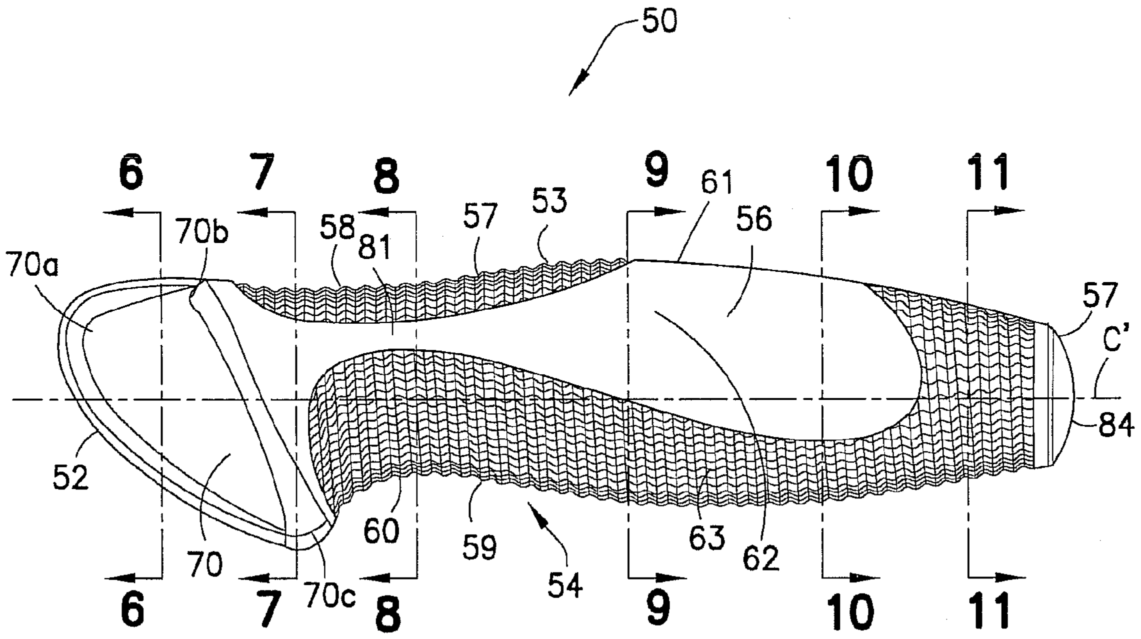
FIG. 3 is a side view of a second embodiment of the handle for a knife as shown in FIG. 1.

Referring to FIGS. 1-2, there is shown knife 10. Knife 10 includes a handle 11 and blade 12 disposed in the handle. Handle 11 includes a proximate end 13, a distal end 14, an upper surface 15, an oppositely disposed lower surface 16, and oppositely disposed sides 17 and 18. Blade 12 is slidably fixedly disposed in the handle distal end 14. Handle upper surface 15 includes ribbed portion 19 with a thumb or alternately palm portion between the thumb and forefinger receiving concave portion or recess 20. Handle lower surface 16 includes ribbed portion 21 having forefinger receiving concave portion or recess 22. An unribbed portion 25 extends entirely from the distal end to the proximate end 13. Unribbed portion 25 is disposed between the ribbed portions 19 and 21 as at 26 in the grip portion of the handle. Unribbed portion 25 includes oppositely disposed generally triangular concave surfaces 40 (typical) for alternately receiving the left and right thumb and forefinger of the user in alternate cutting positions namely, pinch-grip positions, as further discussed hereinafter.

Handle sides 17-18 are progressively outwardly flared or enlarged as at 27-28 (FIG. 2) in the sides, and progressively rearwardly flared or enlarged in the upper and lower surfaces as at 29-30 (FIG. 1), in the palm receiving portion of the grip portion for purposes hereinafter appearing.

Blade 12 includes an upper edge 31, a distal tip 32, a lower or cutting edge 33, a proximate or non-cutting edge 34. Cutting edge 33 extends from distal tip 32 proximately to portion 35, which is disposed below forefinger receiving ribbed concave portion 22. Cutting portion 35 is proximately disposed from pinch-grip surface 40 (typical), for purposes hereinafter appearing.

Triangular recess 40 is unribbed and includes corners or angles 40*a*, 40*b* and 40*c*. Angles 40*a* and 40*b* are disposed above handle centerline C and angle 40*c* is disposed below handle centerline C (FIG. 1). In this manner of construction, the user places the thumb and forefinger, depending on right or left hand use, on the respective recess 40 (typical) and pinches the distal end with the palm engaging the enlarged portion. The user then comfortably cuts with cutting edge, particularly including the proximate end of the cutting edge. Two corners or angles are disposed above the handle centerline C.

Figure 4:
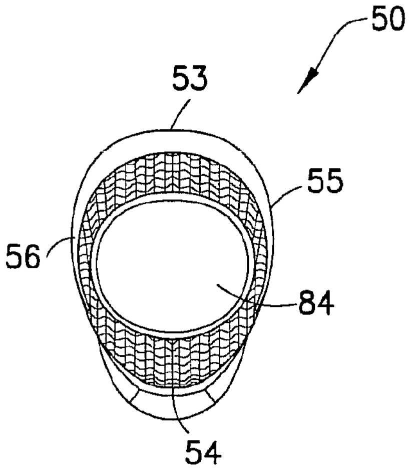
FIG. 4 is a proximate end view of the knife of FIG. 3.
Figure 5:
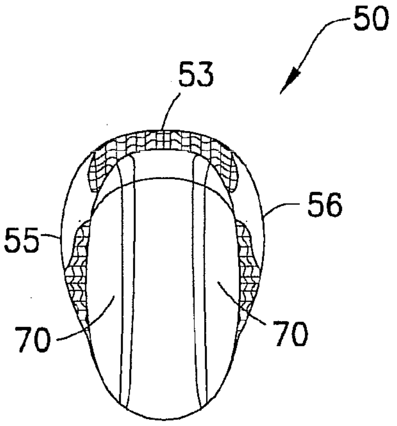
FIG. 5 is a distal end view of the knife of FIG. 3.
Figure 6:
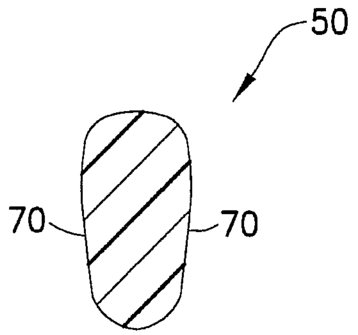
FIG. 6 is a sectional view taken along line 5-5 of FIG. 3.
Figure 7:
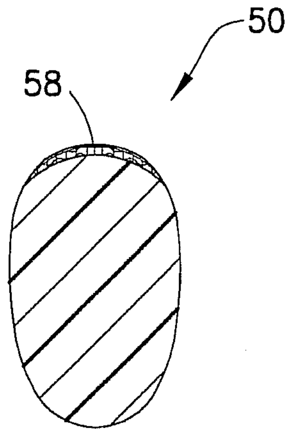
FIG. 7 is a sectional view taken along line 5-5 of FIG. 3.
Figure 8:
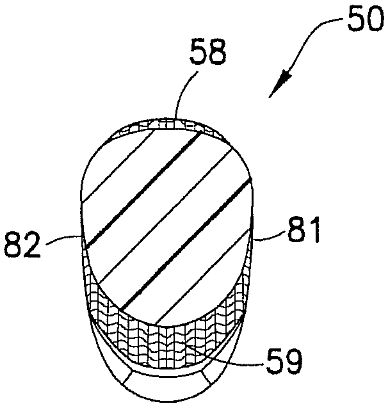
FIG. 8 is a sectional view taken along line 5-5 of FIG. 3.
Figure 9:
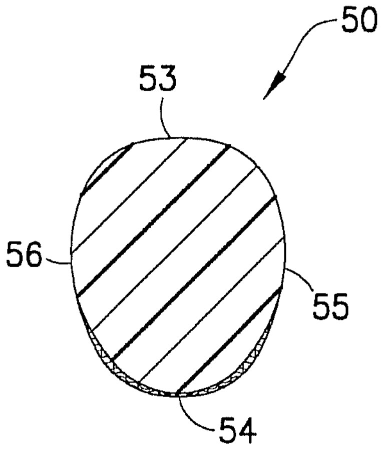
FIG. 9 is a sectional view taken along line 5-5 of FIG. 3.
Figure 10:
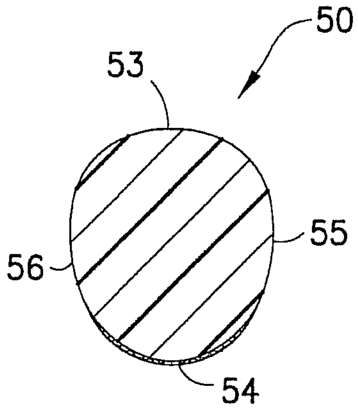
FIG. 10 is a sectional view taken along line 5-5 of FIG. 3.
Figure 11:
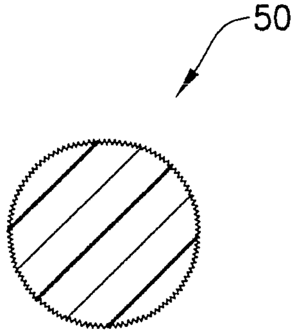
FIG. 11 is a sectional view taken along line 10-10 of FIG. 3.

Referring to FIGS. 3-11, there is shown a further preferred embodiment, handle 50. Handle 50 includes a proximate end 51, a distal end 52, an upper surface 53, an oppositely disposed lower surface 54, and oppositely disposed sides 55 and 56. Handle upper surface 53 includes a ribbed portion 57 having first thumb receiving or alternately a palm portion between the thumb and forefinger receiving concave portion or recess 58. Handle lower surface 54 includes ribbed portion 59 having forefinger or index finger receiving concave portion or recess 60. The grip portion has an enlarged palm receiving portion 61 having an unribbed portion 62 disposed at the upper surface 53 and adjacent the lower surface 54. Oppositely disposed generally triangularly shaped concave unribbed portions 70 include corners or angles 70*a*, 70*b* and 70*c*. Angles 70*a* and 70*b* are disposed above the handle centerline C', and angle 70*c* is disposed below the centerline C'. Triangular portion 70 receives the thumb and forefinger or index finger in respective left and right hand pinch-grip positions. Unribbed portions 70 are contiguous with unribbed side portions as at 81 and 82. Handle sides 55 and 56 are outwardly disposed or enlarged in the grip portion, as best shown in FIGS. 4-5 and 9-10 and handle upper surface 53 and lower surface 54 are enlarged in the grip portion as best shown in FIGS. 4-5 and 9.

Handle distal end 52 receives a with knife blade (not shown). Handles 11 and 50 are preferably formed of molded thermoplastic material. The ribbed portions are formed of the same thermoplastic material as the unribbed portions. The molded portions with the ribs are formed by means will known in the knife handle art. The ribbed and unribbed portions preferably have the same Durometer® hardness. Handle 11 includes a hard plastic distal end cap 44 or 84 for culinary support uses such as to crush garlic cloves, and the like. The handle is manufactured by molding technologies well known in the knife handle art.

The knife handle of the present invention provides four impaired grip cutting positions, namely with (1) the thumb disposed in the upper surface concave ribbed portion (2) the portion of the palm between the thumb and forefinger disposed in or adjacent the upper surface concave ribbed portion with the thumb extending downwardly to the lower surface ribbed recess (3) the thumb in one distal concave triangular unribbed concave portion in a right hand pinch-grip position with the forefinger in the oppositely disposed unribbed concave portion; and (4) the thumb in the other distal concave triangular unribbed portion in a left hand pinch-grip position with the forefinger in the oppositely disposed unribbed concave portion.

In the aforesaid manner of construction, a knife and handle are provided for use by persons having an impaired grip, such as caused by arthritis or other hand impairments. The user grips the aforesaid enlarged grip portion in one of the several afore described positions for alternate cutting modes. The user then undertakes the requisite repeated cutting functions, such as in culinary uses, with comfort and without fatigue.

It is further understood that there are embodiments of this invention that will be obvious to one skilled in the art in view of the foregoing specification, and it is intended that these embodiments be included within the scope of this invention, which scope is limited only by the scope of the appended claims.

What is claimed is:

1. A knife for a user having an impaired grip, said knife comprises:

a handle comprising, a thermoplastic body comprising a ribbed portion and an unribbed portion; and a blade fixedly disposed said handle, said blade comprises an upper edge and a lower edge, said blade lower edge comprises a cutting edge comprising a proximate end portion;

said handle further comprises a proximate end and a distal end, oppositely disposed sides, an upper surface portion and a lower surface portion, said sides are more outwardly disposed at the proximate end than at the distal end; said blade cutting edge extends proximately to a position beneath the handle lower surface portion, said lower surface comprises a convex surface adjacent to the proximate end of the handle and a concave surface adjacent to the distal end of the handle;

said ribbed portion comprises an upper portion and a lower portion, said upper ribbed portion comprises a first thumb engaging recessed surface in a first cutting position; and said sides comprise second and third recessed surfaces distally disposed from said first recessed surface, said first recessed surface being disposed over the cutting edge proximate end portion of the cutting edge;

said blade cutting edge extends proximately to an end point and then extends distally to a point immediately adjacent the second and third recessed surfaces and the lower concave surface;

whereby the user with an impaired grip grips the handle and effectively cuts with the knife blade.

2. The knife of claim 1, said second and third recessed surfaces further comprise unribbed portions.

3. The knife of claim 1, said unribbed portion is disposed adjacent the proximate end in the upper surface and lower surface portion and extends along the sides from the proximate end to distal end.

4. The knife of claim 3, said ribbed and unribbed portions comprise the same Durometer® hardness.

5. The knife of claim 1, said handle further comprises a thermoplastic proximate end cap.

6. The knife of claim 1, each outwardly disposed side comprises a convex curvature extending from the upper surface to the lower surface and comprise the grip portion, and wherein a transverse section at the first thumb receiving recess comprises about parallel sides, and wherein the convex curvature sides extend substantially outwardly from the parallel sides.

7. A knife for impaired grip use comprising:

a handle comprising a proximate end, a distal end, an upper surface, a lower surface, and oppositely disposed side surfaces, said handle lower surface comprises a convex surface adjacent to the proximate end and a concave surface adjacent to the distal end of the handle; said handle comprises a grip portion having an enlarged proximately disposed portion having a sectional area larger than the distally disposed sectional area, said handle further comprises a first recess disposed in said upper surface for a first grip position, and further comprising oppositely disposed second and recesses disposed in respective side surfaces adjacent the handle distal end, said second and third recesses being distally disposed from said first recess; and a blade fixedly disposed in said handle, said blade comprises an upper edge and a lower edge, said blade lower edge comprises a cutting edge that extends proximately and disposed directly below the enlarged proximately disposed handle grip portion, said blade cutting edge extends proximately to a proximate end point disposed below the handle lower surface and then extends distally to a point immediately adjacent the second and third recesses and the lower concave surface;

whereby the impaired grip user grips the handle in one of the first or second grip positions and effectively cuts with the blade.

8. The knife of claim 7, said grip portion comprises ribbed and unribbed portions, one said ribbed portion comprises said upper surface recess, and said unribbed portions comprise said second and receiving recesses.

9. The knife of claim 8, said unribbed portion is disposed adjacent the proximate end in the upper surface and lower surface portion and extends along the sides from the proximate end to distal end.

10. The knife of claim 7, said cutting edge extends more proximately than the first, second and third thumb engaging surfaces.

11. The knife of claim 7, said handle comprises ribbed and unribbed portions, said second and third recesses comprise said unribbed portions, and ribbed and unribbed portions comprise the same hardness.

12. The knife of claim 7, said handle comprises a plurality of ribbed and unribbed portions and said sides comprise two respective said unribbed portions that extend entirely along the respective sides from the distal end of the handle to the proximate end of the handle.

13. A knife handle for impaired grip use comprising:

a proximate end, a distal end, an upper surface, a lower surface, and oppositely disposed sides; said lower surface comprises a convex surface adjacent to the proximate end and a concave surface adjacent to the distal end of the handle, said handle comprises a grip portion having a proximately disposed enlarged portion being enlarged from the upper surface to the lower surface and being outwardly enlarged from one side to the other side, each outwardly enlarged and proximately disposed side comprises a convex curvature extending from the upper surface to the lower surface and further comprising a first thumb receiving recess in the upper surface, said sides comprise respective second and third recesses, said second and third recesses being distally disposed from said first recess, said enlarged portion comprises ribbed and unribbed surfaces, said blade cutting edge extends proximately to a proximate end point disposed below the handle lower surface and then distally to a point immediately adjacent the second and third recess and the lower concave surface; whereby an impaired grip user comfortably grips the handle.

14. The knife handle of claim 13, wherein a transverse section at the thumb receiving recess comprises parallel sides and a transverse section in the grip portion comprises the convex curvature sides, and wherein the convex curvature sides extend substantially outwardly from the about parallel sides.

15. The knife handle of claim 13, said grip portion comprises ribbed and unribbed portions, and second thumb receiving and third recesses comprise unribbed portions.

16. The knife handle of claim 13, each said grip portion convex curvature being disposed immediately adjacent the proximate end.

* * * * *